(12) United States Patent
Ouyang (10) Patent No.: US 11,508,536 B2
(45) Date of Patent: Nov. 22, 2022

(54) BATTERY ASSEMBLY AND ELECTRONIC CIGARETTE HAVING SAME

(71) Applicant: SHENZHEN IVPS TECHNOLOGY CO., LTD., Shenzhen (CN)

(72) Inventor: Junwei Ouyang, Shenzhen (CN)

(73) Assignee: SHENZHEN IVPS TECHNOLOGY CO., LTD., Shenzhen (CN)

( * ) Notice: Subject to any disclaimer, the term of this patent is extended or adjusted under 35 U.S.C. 154(b) by 1013 days.

(21) Appl. No.: 16/159,615

(22) Filed: Oct. 13, 2018

(65) Prior Publication Data
US 2019/0223501 A1    Jul. 25, 2019

(30) Foreign Application Priority Data
Jan. 19, 2018    (CN) .......................... 201820104782.7

(51) Int. Cl.
| | |
|---|---|
| *H01H 9/06* | (2006.01) |
| *H01M 50/20* | (2021.01) |
| *H01M 50/213* | (2021.01) |
| *A24F 40/40* | (2020.01) |
| *A24F 40/60* | (2020.01) |
| *H01M 10/42* | (2006.01) |
| *A24F 40/10* | (2020.01) |

(52) U.S. Cl.
CPC .............. *H01H 9/06* (2013.01); *A24F 40/40* (2020.01); *A24F 40/60* (2020.01); *H01M 10/425* (2013.01); *H01M 50/20* (2021.01); *H01M 50/213* (2021.01); *A24F 40/10* (2020.01); *H01H 2009/065* (2013.01); *H01M 2220/30* (2013.01)

(58) Field of Classification Search
CPC . H01H 9/06; A24F 40/40; A24F 40/10; A24F 40/60; H01M 50/20; H01M 50/21; H01M 10/425; H01M 2009/065; H01M 2200/30
USPC ........................................................ 131/328
See application file for complete search history.

(56) References Cited

U.S. PATENT DOCUMENTS

| | | | |
|---|---|---|---|
| 9,399,110 B2 * | 7/2016 | Goodman | ............. A61M 15/06 |
| 9,770,564 B2 * | 9/2017 | Goodman | ............... A24F 40/48 |
| 2013/0199528 A1 | 8/2013 | Goodman et al. | |

(Continued)

FOREIGN PATENT DOCUMENTS

| | | | | |
|---|---|---|---|---|
| CN | 206284394 U | * | 6/2017 | ............. A24F 47/00 |
| CN | 206284394 U | | 6/2017 | |
| KR | 20120007263 U | * | 10/2012 | ........... A24B 15/167 |

(Continued)

*Primary Examiner* — Peter G Leigh
(74) *Attorney, Agent, or Firm* — IP-PAL Patent US; Klaus Michael Schmid (57) ABSTRACT

The invention discloses a battery assembly and an electronic cigarette using the battery assembly, wherein the battery assembly comprises a main body, a circuit board mounted in the main body and a button assembly, the main body is provided with an avoidance hole and at least one stopper, the button assembly comprises a button cap and a button contact, the button contact is fixedly mounted in the main body and is electrically connected with the circuit board, and the button cap is slidably mounted in the avoidance hole. When the button cap slides to squeeze the button contact, the button cap abuts against the stopper to form a trigger position where the button cap triggers the button contact to transmit a control signal to the circuit board.

8 Claims, 7 Drawing Sheets

(56) References Cited

U.S. PATENT DOCUMENTS

2014/0041658 A1* 2/2014 Goodman ............ A61M 11/041
128/203.14
2017/0347708 A1* 12/2017 Shin ...................... A61M 15/06

FOREIGN PATENT DOCUMENTS

| KR | 101285213 B1 * | 7/2013 | ............ A24B 15/167 |
| KR | 101772344 B1 * | 11/2016 | ............ A61M 15/06 |

* cited by examiner

BATTERY ASSEMBLY AND ELECTRONIC CIGARETTE HAVING SAME

TECHNICAL FIELD

The invention relates to a battery assembly and an electronic cigarette using the battery assembly.

BACKGROUND

Electronic cigarettes, also known as electronic cigarettes, are mainly used to quit smoking and replace conventional cigarettes. It has an appearance and taste similar to conventional cigarettes, and even has more tastes than conventional cigarettes. It can generate smoke, a taste and a feel like conventional cigarettes. Without tar, suspension particles and other harmful components in conventional cigarettes, electronic cigarettes have gradually replaced conventional cigarettes on the market. The existing electronic cigarettes supply power to the heat generating unit in the atomizer through the battery assembly, so that the heat generating unit heats the tobacco liquid to generate smoke under the driving of the battery assembly, thereby enabling the user to obtain a smoking experience.

The battery assembly in the market usually controls the battery assembly by pressing the control button. However, the battery assembly is usually not provided with a stopper to limit the movement stroke of the button assembly. During the long-term use of the user, the button assembly excessively squeezes the internal trigger component for a long time so that the button assembly is low in service life. At the same time, when the pressing force applied by the user is too large, the phenomenon that the button assembly crushes the circuit board is likely to occur.

SUMMARY

The main object of the invention is to provide a battery assembly, which aims to prevent the phenomenon that a large pressing force applied by the user to the button assembly results in a low service life of the button assembly and crushes the circuit board.

In order to achieve the above object, the invention provides a battery assembly comprising a main body, a circuit board mounted in the main body and a button assembly, wherein the main body is provided with an avoidance hole and at least one stopper, the button assembly comprises a button cap and a button contact, the button contact is fixedly mounted in the main body and is electrically connected with the circuit board, and the button cap is slidably mounted in the avoidance hole. When the button cap slides to squeeze the button contact, the button cap abuts against the stopper to form a trigger position where the button cap triggers the button contact to transmit a control signal to the circuit board.

Preferably, an elastic member is further provided between the button cap and the button contact, one of the button cap and the button contact is fixedly connected with the elastic member, and the other thereof elastically abuts against the elastic member.

Preferably, one of the button cap and the elastic member is convexly provided with a fixed column, and the other thereof is provided with a groove, the fixed column is inserted into the groove, and the elastic member is fixed to the button cap.

Preferably, the button cap is further convexly provided with at least one limiting member, and each of the limiting members abuts against a portion of the outer periphery of the elastic member when the elastic member is fixedly mounted to the button cap.

Preferably, the elastic member is further provided with an extending part which elastically abuts against the side structure of the circuit board when the button cap slides to the trigger position.

Preferably, one of the extending part and the button cap is provided with a connecting buckle, and the other thereof is provided with a connecting groove, and the connecting buckle is inserted into the connecting groove to fix the extending part to the button cap.

Preferably, an end of the button cap facing the button contact is further provided with a flange, when the flange is in contact with the periphery of the avoidance hole, the flange abuts against the periphery of the avoidance hole, thus limiting the button cap to the main body.

Preferably, the main body comprises a sleeve, a connecting assembly and an end cover, the sleeve is provided with a battery chamber for receiving the battery, the end cover and the connecting assembly are fixedly mounted on both ends of the sleeve, respectively, and block the battery chamber, the connecting assembly is fixedly connected with the circuit board and is used to connect an external load and conduct the external load and the circuit board, and the avoidance hole is provided on the outer periphery of the sleeve.

Preferably, the sleeve is further provided with at least one light-transmitting decorative member around the avoidance hole, the main body is further provided with at least one light source, the light source is electrically connected with the circuit board, and the light emitted by the light source is at least partially transmitted from the light-transmitting decorative member; and/or the connecting assembly comprises a negative electrode connector, an insulating member and a positive electrode conductive column, the negative electrode connector is provided with a through hole in which an external load is mounted and an avoidance groove in which the button cap reciprocates, the avoidance groove is convexly provided with at least one stopper, the insulating member is sleeved on the outer periphery of the positive electrode conductive column and abuts against the inner wall of the through hole, the positive electrode conductive column is fixed in the through hole, and the circuit board is electrically connected with the positive electrode conductive column and the negative electrode connector.

The invention further provides an electronic cigarette comprising an atomizer, wherein the battery assembly comprises a main body, a circuit board mounted in the main body and a button assembly, the main body is provided with an avoidance hole and at least one stopper, the button assembly comprises a button cap and a button contact, the button contact is fixedly mounted in the main body and is electrically connected with the circuit board, the button cap is slidably mounted in the avoidance hole and abuts against the stopper when the button cap slides to squeeze the button contact to form a trigger position and trigger the button contact to transmit a control signal to the circuit board, and one end of the atomizer is fixedly mounted to the battery assembly and is electrically connected with a circuit board provided inside the battery assembly.

For the battery assembly of the technical solution of the invention, the main body is provided with an avoidance hole and at least one stopper. When the user presses the button cap, the button cap is driven to abut against the stopper when the button cap slides along the avoidance hole to squeeze the button contact. When the user further presses the button cap with an excessive force, the stopper has a limiting supporting force on the button cap, limiting the button cap to further squeeze the button contact, preventing the phenomenon that the deformation of the button contact under the action of a large pressing force during long-term use results in a decreased trigger sensitivity, effectively improving the service life of the button assembly, and preventing the phenomenon that a large pressing force crushes the circuit board.

BRIEF DESCRIPTION OF THE DRAWINGS

For a better illustration of the embodiments of the invention or the technical solution in the prior art, accompanying drawings needed in the description of the embodiments or the prior art are simply illustrated below. Obviously, the accompanying drawings described below are some embodiments of the invention. For those skilled in the art, other accompanying drawings may be obtained according to the structure shown in these accompanying drawings without creative work.

DESCRIPTION OF THE REFERENCE NUMBERS

| Reference | Name of part | Reference | Name of part |
| --- | --- | --- | --- |
| 100 | battery assembly | 31 | plug-in terminal |
| 10 | main body | 50 | button assembly |
| 11 | sleeve | 51 | button cap |
| 111 | battery chamber | 511 | Fixed column |
| 112 | avoidance hole | 512 | limiting member |
| 113 | light-transmitting decorative member | 5121 | auxiliary bump |
|  |  | 513 | flange |
| 12 | connecting assembly | 514 | connecting groove |
| 121 | negative electrode connector | 52 | button contact |
| 1211 | through hole | 53 | elastic member |
| 1212 | avoidance groove | 531 | groove |
| 1213 | stopper | 532 | extending part |
| 122 | Insulating assembly | 5321 | connecting buckle |
| 123 | positive electrode conductive column | 60 | covering member |
|  |  | 70 | battery |
| 124 | spring |  |  |
| 13 | end cover |  |  |
| 30 | circuit board |  |  |

The implementation of aims, the function features and the advantages of the invention are described below in further detail in conjunction with embodiments with reference to the drawings.

DESCRIPTION OF THE EMBODIMENTS

A clear and complete description as below is provided for the technical solution in the embodiments of the invention in conjunction with the drawings in the embodiments of the invention. Obviously, the embodiments described hereinafter are simply part embodiments of the invention, rather than all the embodiments. All other embodiments obtained by those skilled in the art based on the embodiments in the invention without creative work are intended to be comprised in the scope of protection of the invention.

It should be noted that all directional indications (such as top, bottom, left, right, front, behind . . . ) in the embodiments of the invention are merely to illustrate a relative position relation, a relative motion condition, etc. between each part in a certain state (for example, the state shown in the drawings). If the state changes, the directional indication changes accordingly.

In addition, if terms "first", "second", etc. appear in the invention, they are merely for the purpose of description, but cannot be understood as the indication or implication of relative importance or as the implicit indication of the number of the designated technical features; therefore, features defined by "first" and "second" may specifically or implicitly comprise at least one such feature. In addition, technical solutions of each embodiment of the invention may be combined mutually; however, this must be carried out on the basis that those skilled in the art can implement the combination. When the combination of technical solutions has a conflict or cannot be implemented, it should be considered that such combination of technical solutions does not exist and is not in the scope of protection claimed by the invention.

In the invention, unless otherwise specifically stated and defined, terms "connected", "fixed", etc. should be interpreted expansively. For example, "fixed" may be fixed connection, detachable connection, or integration; may be mechanical connection or electrical connection; direct connection, indirect connection through an intermediate, or internal communication between two elements or interaction of two elements, unless otherwise specifically defined. Those skilled in the art can understand the specific implication of the above terms in the invention according to specific conditions.

The invention provides a battery assembly 100, which is applied to an electronic cigarette. The electronic cigarette comprises an atomizer (not shown). An oil storing chamber and a heat generating assembly are provided in the atomizer. The battery assembly 100 is provided with a connecting assembly which is fixedly electrically connected with the atomizer, and the circuit board 30 provided in the battery assembly 100 controls the output current of the power supply to supply power to the heat generating assembly in the atomizer, so that the heat generating assembly heats tobacco tar when driven by the battery assembly 100 to generate smoke, thus giving the user a smoking experience. The battery assembly 100 is provided with a rechargeable battery element 70 therein, and is provided with a plug-in terminal 31 for charging and data transmission. The plug-in terminal 31 may use a micro jack, a lighting jack or a type c jack.

Referring to FIG. 1 to FIG. 7, in the embodiment of the invention, the battery assembly 100 comprises a main body 10, a circuit board 30 mounted in the main body 10 and a button assembly 50, wherein the main body 10 is provided with an avoidance hole 112 and at least one stopper 1213, the button assembly 50 comprises a button cap 51 and a button contact 52, the button contact 52 is fixedly mounted in the main body 10 and is electrically connected with the circuit board 30, and the button cap 51 is slidably mounted in the avoidance hole 112 and abuts against the stopper 1213 when the button cap slides to squeeze the button contact 52 to form a trigger position and trigger the button contact 52 to transmit a control signal to the circuit board 30.

For the battery assembly 100 of the technical solution of the invention, the main body 10 is provided with an avoidance hole 112 and at least one stopper 1213. When the user presses the button cap 51, the button cap 51 is driven to abut against the stopper 1213 when the button cap 51 slides along the avoidance hole 112 to squeeze the button contact 52. When the user further presses the button cap with an excessive force, the stopper 1213 has a limiting supporting force on the button cap 51, limiting the button cap 51 to further squeeze the button contact 52, preventing the phenomenon that the deformation of the button contact 52 under the action of a large pressing force during long-term use results in a decreased trigger sensitivity, effectively improving the service life of the button assembly 50, and preventing the phenomenon that a large pressing force crushes the circuit board 30.

Figure 1:
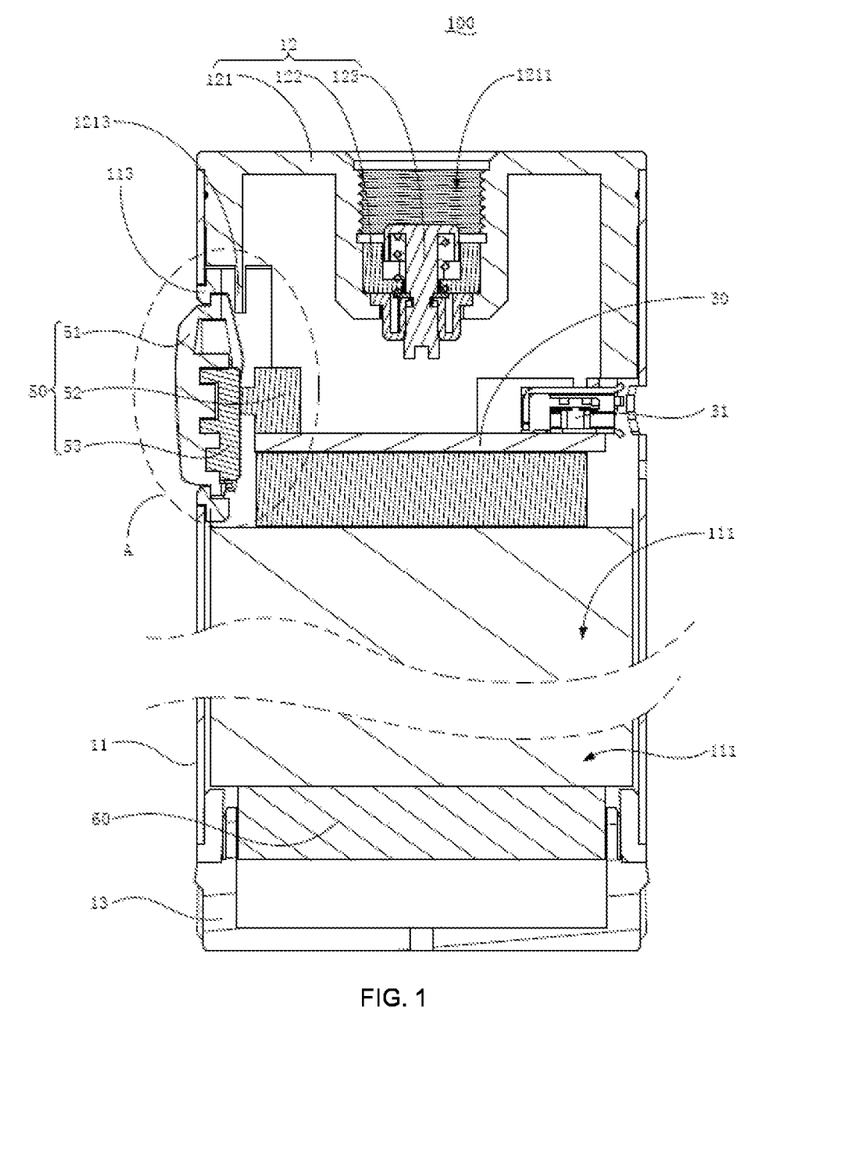
FIG. 1 is a schematic cross-sectional diagram illustrating a connecting structure of a battery assembly according to the invention.
Figure 2:
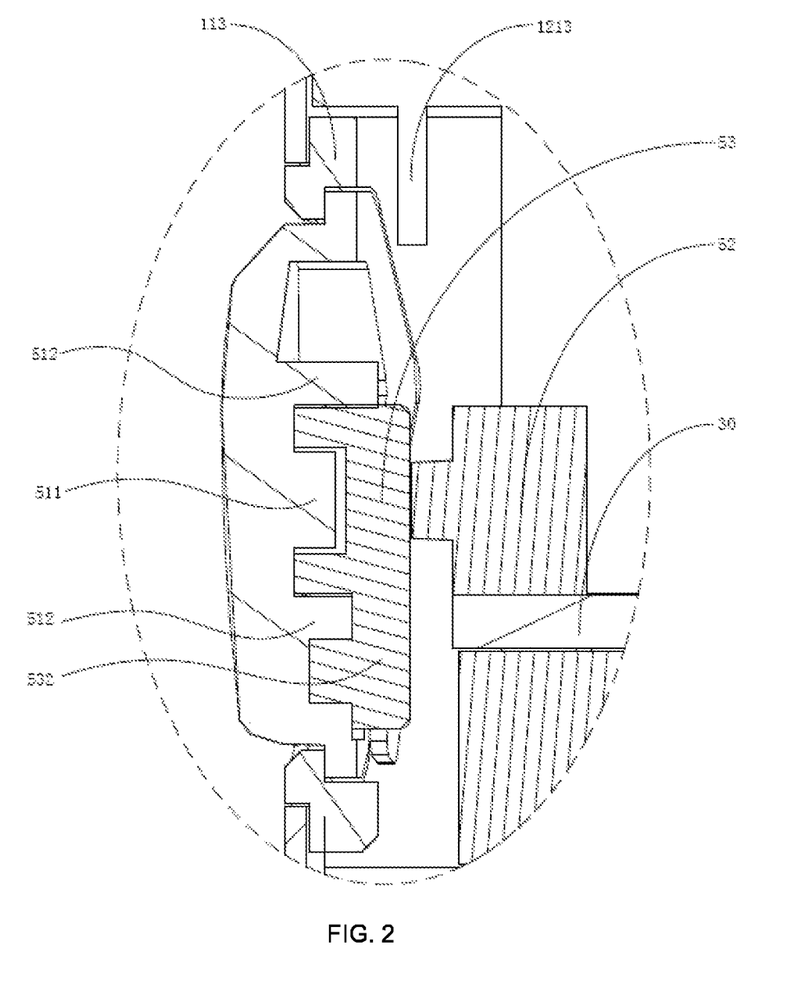
FIG. 2 is a partial enlarged schematic diagram at A in FIG. 1 according to the invention.
Figure 3:
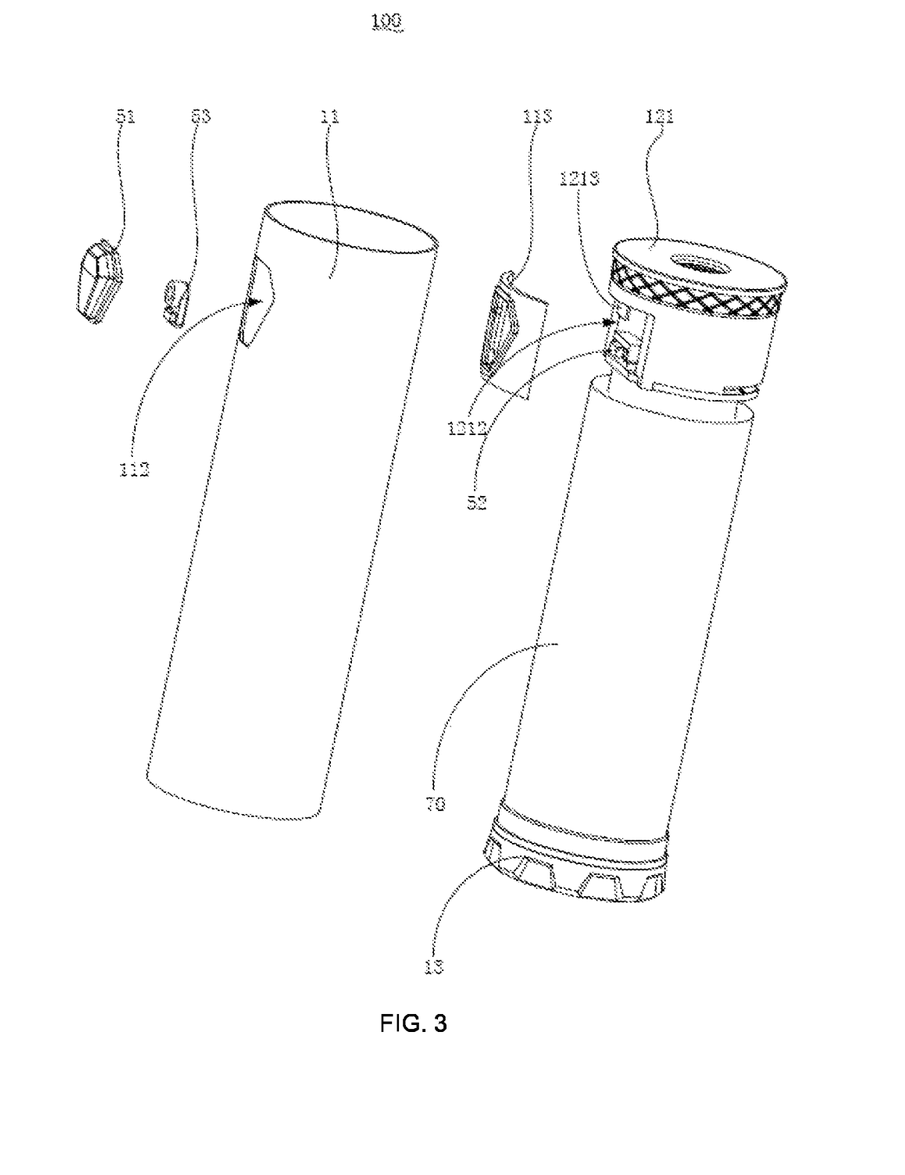
FIG. 3 is an exploded schematic diagram illustrating a connecting structure of a battery assembly according to the invention.

Further, as shown in FIG. 1 to FIG. 3, in the embodiment of the invention, an elastic member 53 is further provided between the button cap 51 and the button contact 52, one of the button cap 51 and the button contact 52 is fixedly connected with the elastic member 53, and the other thereof elastically abuts against the elastic member 53. Here, in the embodiment, one end of the elastic member 53 is fixed to the button cap 51, and the other end elastically abuts against the button contact, thereby effectively improving the resilience generated when the button cap 51 is released after being pressed, so that the button cap 51 slides toward the outside of the main body 10 along the avoidance hole 112 under the elastic restoring force of the elastic member 53 when not pressed, and is partially exposed to the outside of the main body 10 for the user to press.

It is to be understood that, in the actual application process, the manner in which the elastic member 53 may use a spring 124, an elastic silicone rubber or elastic plastic to improve the resilience generated when the button cap 51 is released after being pressed falls within the scope of protection of the invention. Similarly, the mounting manner in which one end of the elastic member 53 may also be fixedly connected with the elastic contact, and the other end elastically abuts against the button cap 51 falls within the scope of protection of the invention.

Further, as shown in FIG. 1 to FIG. 4, in the embodiment of the invention, one of the button cap 51 and the elastic member 53 is convexly provided with a fixed column 511, and the other thereof is provided with a groove 531, the fixed column 511 is inserted into the groove 531, and the elastic member 53 is fixed to the button cap 51. Here, in the embodiment, the elastic member 53 is made of elastic silicone. One end of the button end 51 toward the button contact 52 is convexly provided with a fixed column 511, and then a groove 531 is provided in the elastic silicone. The area surrounded by the periphery of the groove 531 is slightly smaller than the surface area surrounded by the outer periphery of the fixed column 511. When the fixed column 511 is inserted into the groove 531, the inner wall of the groove 531 is squeezed to be fixed in an interference fit. At the same time, the extruded elastic silicone has a retractable elastic deformation force, so that it is closely sleeved to the fixed column 511, effectively preventing the phenomenon that the elastic member 53 is disengaged from the button cap 51 during the long-term use of the button assembly 50.

Further, as shown in FIG. 1 to FIG. 4, in the embodiment of the invention, the button cap 51 is further convexly provided with at least one limiting member 512, and each of the limiting members 512 abuts against a portion of the outer periphery of the elastic member 53 when the elastic member 53 is fixedly mounted to the button cap 51. Here, in the present embodiment, the button cap 51 is convexly provided with an annular limiting member 512. When the elastic member 53 is sleeved to the fixed column 511, the elastic limiting member 512 is sleeved to the outer periphery of the end of the elastic member 53 provided with a groove 531, and the elastic member 53 is partially buckled between the limiting member 512 and the fixed column 511, thereby further preventing the phenomenon that the elastic member 53 is disengaged from the button cap 51 during the long-term use of the button assembly 50.

It is to be understood that, in the actual application process, the button cap 51 is not limited to preventing the phenomenon that the elastic member 53 is disengaged from the button cap 51 in such a manner that the annular limiting member 512 is convexly provided. For example, the button cap 51 may be also convexly provided with a plurality of limiting blocks. The manner in which the limiting blocks are provided at intervals around the fixed column 511 to partially buckle the elastic member 53 between the limiting member 512 and the fixed column 511 to prevent the elastic member 53 from being disengaged from the button cap 51 falls within the scope of protection of the invention.

Figure 4:
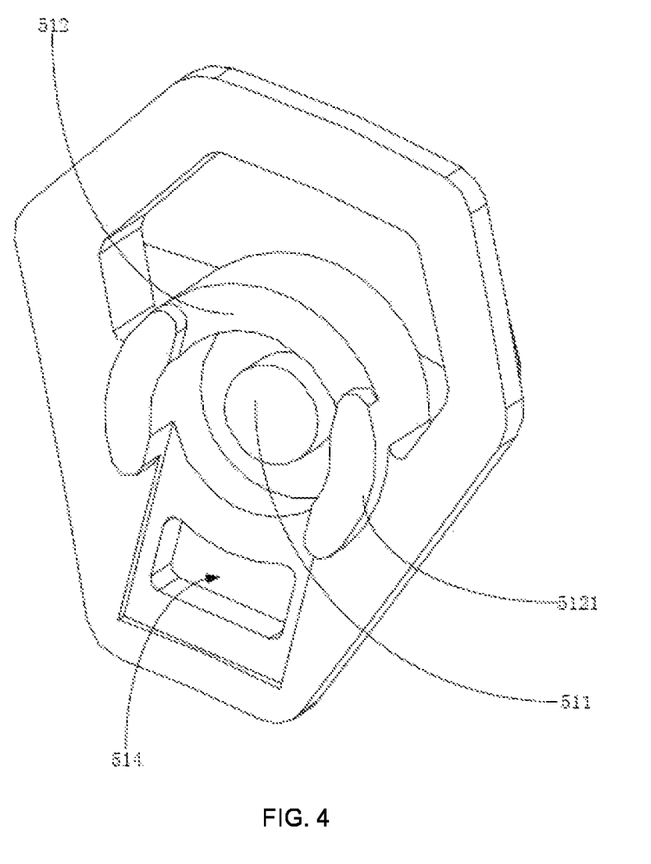
FIG. 4 is a perspective schematic diagram illustrating a connecting structure of a button cap in a battery assembly according to the invention.

Specifically, as shown in FIG. 4, in the embodiment of the invention, one end of the annular limiting block far away from the button cap 51 is further convexly provided with two auxiliary bumps 5121 which abuts against the outer periphery of the elastic member 53, effectively increasing the clamping area with the elastic member 53, and further preventing the phenomenon that the elastic member 53 is disengaged from the button cap 51 during the long-term use of the button assembly 50.

Further, as shown in FIG. 1 or FIG. 2, in the embodiment of the invention, the elastic member 53 is further provided with an extending part 532 which elastically abuts against the side structure of the circuit board 30 when the button cap 51 slides to the trigger position. Here, in the present embodiment, the elastic member 53 is further provided with an extending part 532. When the button cap 51 slides to the trigger position, that is, in the process that the button cap 51 slides to squeeze the elastic contact, the extending part 532 is first in contact with the side structure of the circuit board 30, and as the button cap 51 continues to slide, the extending part 532 elastically squeezes the circuit board 30. The elastic resisting force is continuously increased, further preventing the phenomenon that when the pressing force of the user is excessive, the button contact 52 is deformed, resulting in a decrease in sensitivity.

Further, as shown in FIG. 1 or FIG. 2, in the embodiment of the invention, one of the extending part 532 and the button cap 51 is provided with a connecting buckle 5321, and the other thereof is provided with a connecting groove 514, and the connecting buckle 5321 is inserted into the connecting groove 514 to fix the extending part 532 to the button cap 51.

Here, in the present embodiment, one end of the extending part 532 far away from the groove 531 is convexly provided with a connecting buckle 5321, the button cap 51 is provided with a connecting groove 514, the connecting buckle 5321 is fastened to the connecting groove 514, and one end of the extending part 532 far away from the groove 531 is fixed to the button cap 51, thereby effectively preventing the phenomenon that the elastic member 53 is disengaged from the button cap 51 due to the misalignment of the extending part 532 during the long-term use.

It is to be understood that, in the actual application process, the extending part 532 and the button cap 51 are not limited to the manner in which a connecting buckle 5321 and a connecting groove 514 are provided to be fastened and connected. For example, the manner in which a fastener such as a screw is fixed, a plurality of buckles and necks are fastened, or one end of the extending part 532 far away from the groove 531 extends away from the button cap 51 to abut against the circuit board 30, and the extending part 532 abuts against the outer surface of the button cap 51 may also be used. All the manners fall within the scope of protection of the invention.

Figure 5:
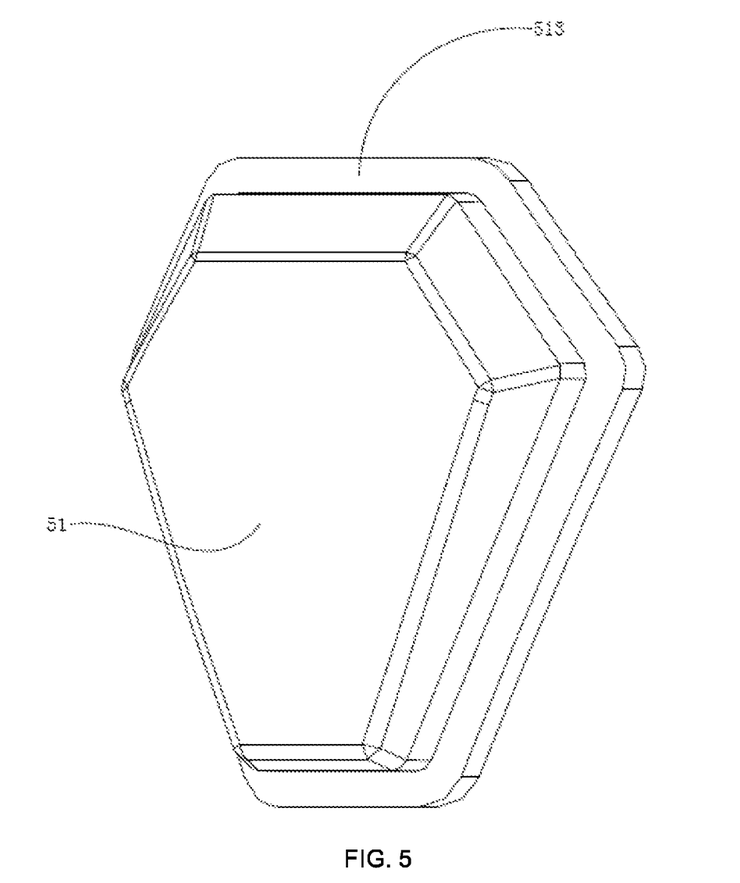
FIG. 5 is a perspective schematic diagram illustrating a connecting structure of a button cap in a battery assembly according to the invention from another perspective.
Figure 6:
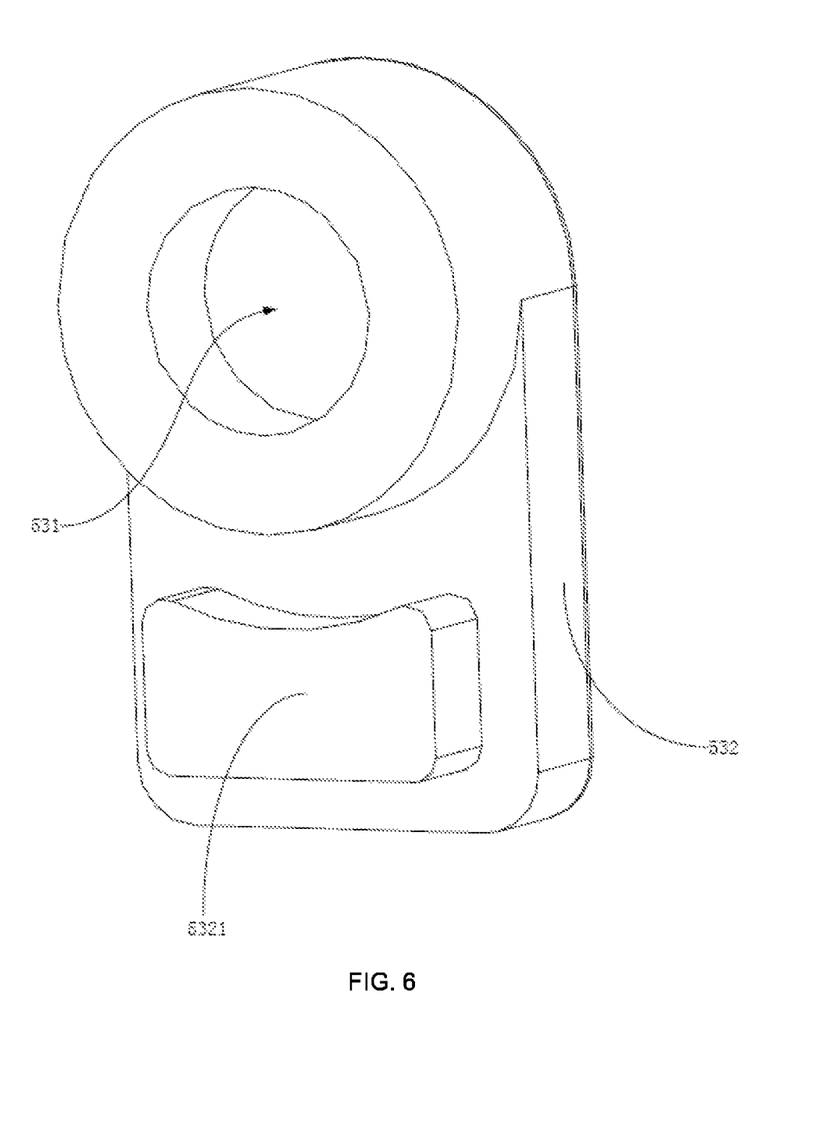
FIG. 6 is a perspective schematic diagram illustrating a connecting structure of an elastic member in a battery assembly according to the invention.
Figure 7:
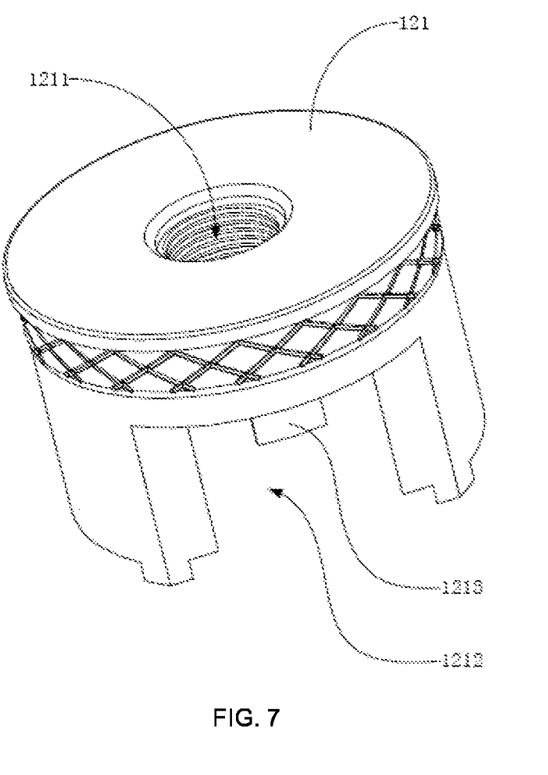
FIG. 7 is a perspective schematic diagram illustrating a connecting structure of a negative electrode connector in a battery assembly according to the invention.

Further, as shown in FIG. 5, in the embodiment of the invention, the end of the button cap 51 toward the button contact 52 is further provided with a flange 513, which abuts when being in contact with the periphery of the avoidance hole 112 to limit the button cap 51 to the main body 10. Here, in the embodiment, the end of the button cap 51 toward the button contact 52 is further provided with a flange 513. The button cap 51 slides along the avoidance hole 112 from the outside of the main body 10 to the flange 513 under the elastic restoring force of the elastic member 53 to abut against the periphery of the avoidance hole 112, thereby effectively preventing the phenomenon that the button cap 51 is disengaged from the main body 10.

Specifically, as shown in FIG. 3, in the embodiment of the invention, the main body 10 comprises a sleeve 11, a connecting assembly 12 and an end cover 13, the sleeve 11 is provided with a battery chamber 111 for receiving the battery 70, the end cover 13 and the connecting assembly 12 are fixedly mounted on both ends of the sleeve 11, respectively, and block the battery chamber 111, the connecting assembly 12 is fixedly connected with the circuit board 30 and is used to connect an external load and conduct the external load and the circuit board 30, and the avoidance hole 112 is provided on the outer periphery of the sleeve 11. Here, in the present embodiment, the main body 10 is generally in the shape of a rod. The sleeve 11 is provided with a battery chamber 111 for receiving the battery 70. The end cover 13 is fixedly connected with the sleeve 11 by a thread and blocks the battery chamber 111. The connecting assembly 12 is fixedly mounted on an end of the sleeve 11 far away from the end cover 13. The circuit board 30 is mounted in the sleeve 11 and is fixedly connected with the connecting assembly 12 by a screw, thereby effectively preventing the circuit board 30 from shaking, and facilitating the wiring of the circuit board 30 and the connecting assembly 12, effectively saving mounting space and reducing product volume.

Further, as shown in FIG. 3, in the embodiment of the invention, the sleeve 11 is further provided with at least one light-transmitting decorative member 113 around the avoidance hole 112, the main body 10 is further provided with at least one light source, the light source is electrically connected with the circuit board 30, and the light emitted by the light source is at least partially transmitted from the light-transmitting decorative member 113. Here, in the embodiment, a plurality of LED light sources are integrated on the circuit board 30, the plurality of LED light sources are arranged on both surfaces of the circuit board 30 toward the connecting assembly 12 and far away from the connecting assembly 12, and the light emitted from each of the LED light sources is at least partially transmitted from the light-transmitting decorative member 113, thereby preventing the light from being shielded by the circuit board 30 or other components, resulting in a phenomenon that the light transmitted through the light-transmitting decorative member 113 has different luminosities. When the user presses the button cap 51 to squeeze the button contact 52 to transmit a control signal to the circuit board 30, the control circuit provided by the circuit board 30 controls each of the LED light sources to emit light to generate an indication effect, effectively reminding the user of the operating state of the battery assembly 100.

It is to be understood that, in the actual application process, the manner in which those skilled in the art may also adjust the illumination intensity, strobe flash and color conversion of the LED lamp bead by adding a PWM circuit module (not shown) on the circuit board 30 to realize various lighting effects falls within the scope of protection of the invention.

Specifically, as shown in FIG. 1, in the embodiment of the invention, both ends of the battery 70 are further provided with a covering member 60. In the embodiment, the covering member 60 is made of foam, effectively preventing the phenomenon that the hard contact between both ends of the battery 70 results in crushing short circuit.

Further, as shown in FIG. 1, in the embodiment of the invention, the circuit board 30 is electrically connected with a plug-in terminal 31 for electrically charging and transmitting data inside the battery chamber 111. The outer periphery of the sleeve 11 is correspondingly provided with a plug-in interface exposing the plug-in terminal 31. Here, in the present embodiment, the plug-in terminal 31 is provided so that the user can perform charging without disassembling the internal battery 70, which greatly facilitates the ease of use of the user.

Further, as shown in FIG. 1, in the embodiment of the invention, the connecting assembly 12 comprises a negative electrode connector 121, an insulating member 122 and a positive electrode conductive column 123, the negative electrode connector 121 is provided with a through hole 1211 in which an external load is mounted and an avoidance groove 1212 in which the button cap 51 reciprocates, the avoidance groove 1212 is convexly provided with at least one stopper 1213, the insulating member 122 is sleeved on the outer periphery of the positive electrode conductive column 123 and abuts against the inner wall of the through hole 1211, the positive electrode conductive column 123 is fixed in the through hole 1211, and the circuit board 30 is electrically connected with the positive electrode conductive column 123 and the negative electrode connector 121. Here, in the embodiment, the negative electrode connector 121 comprises a first tube body (not labeled), a second tube body (not labeled) provided in the first tube body, and a connecting plate (not labeled) connecting the first tube body and the second tube body. A part of the outer periphery of the first tube body is provided at irregular pattern bone position (not labeled), and is convenient to abut against and clamp the inner wall of the sleeve 11 in an interference fit. The first sleeve 11 is provided with an avoidance groove 1212 in which the button cap 51 reciprocates. The stopper 1213 is convexly provided in the inner groove wall of the avoidance groove 1212 to be machine-shaped with the negative electrode connector 121 integrally, which is convenient to process and takes up small space. The second sleeve 11 forms a through hole 1211 in which an external load is mounted. The inner wall of the through hole 1211 is provided with a connecting thread (not labeled). The insulating member 122 is sleeved on the positive electrode conductive column 123 and abuts against the inner wall of the through hole 1211. The positive electrode conductive column 123 is fixed to the through hole 1211. The circuit board 30 is electrically connected with the positive electrode conductive column 123 and the negative electrode connector 121. The negative electrode conductive end of the external load is fixedly electrically connected with the negative electrode connector 121 through a connecting screw. The positive electrode conductive end elastically abuts against the positive electrode conductive column 123 to form an electrical circuit, thereby effectively ensuring the stability of the power supply.

The invention further provides an electronic cigarette, wherein the electronic cigarette comprises an atomizer and a battery assembly 100. Refer to the above embodiment for the specific structure of the battery assembly 100. Due to the use of all the technical solutions of all the above embodiments, the electronic cigarette has at least all the beneficial effects brought by the technical solutions of the above embodiments, which will not be described in detail herein.

The above are preferred embodiments of the invention merely and are not intended to limit the patent scope of the invention. Any equivalent structures made according to the description and the accompanying drawings of the invention without departing from the idea of the invention, or any equivalent structures applied in other relevant technical fields directly or indirectly are intended to be comprised in the patent protection scope of the invention.

What is claimed is:

1. A battery assembly comprising a main body, a circuit board mounted in the main body and a button assembly, wherein the main body is provided with an avoidance hole and at least one stopper, the button assembly comprises a button cap and a button contact, the button contact is fixedly mounted in the main body and is electrically connected with the circuit board, and the button cap is slidably mounted in the avoidance hole, when the button cap slides to squeeze the button contact, the button cap abuts against the stopper to form a trigger position where the button cap triggers the button contact to transmit a control signal to the circuit board;
wherein an elastic member is further provided between the button cap and the button contact, one of the button cap and the button contact is fixedly connected with the elastic member, and the other elastically abuts against the elastic member; and wherein the elastic member is further provided with an extending part, when the button cap slides to the trigger position, the extending part elastically abuts against aside structure of the circuit board.

2. The battery assembly according to claim 1, wherein one of the button cap and the elastic member is convexly provided with a fixed column, and the other is provided with a groove, the fixed column is inserted into the groove, so that the elastic member is fixed to the button cap.

3. The battery assembly according to claim 2, wherein the button cap is further convexly provided with at least one limiting member, when the elastic member is fixedly mounted to the button cap, each of the limiting members abuts against a portion of an outer periphery of the elastic member.

4. The battery assembly according to claim 1, wherein one of the extending part and the button cap is provided with a connecting buckle, and the other is provided with a connecting groove, and the connecting buckle is inserted into the connecting groove to fix the extending part to the button cap.

5. The battery assembly according to claim 1, wherein an end of the button cap facing the button contact is further provided with a flange, when the flange is in contact with the periphery of the avoidance hole, the flange abuts against the periphery of the avoidance hole, thus limiting the button cap to the main body.

6. The battery assembly according to claim 1, wherein the main body comprises a sleeve, a connecting assembly and an end cover, the sleeve is provided with a battery chamber for receiving the battery, the end cover and the connecting assembly are fixedly mounted on both ends of the sleeve, respectively, and block the battery chamber, the connecting assembly is fixedly connected with the circuit board and is used to connect an external load and conduct the external load and the circuit board, and the avoidance hole is provided on the outer periphery of the sleeve.

7. The battery assembly according to claim 6, wherein the sleeve is further provided with at least one light-transmitting decorative member around the avoidance hole, the main body is further provided with at least one light source, the light source is electrically connected with the circuit board, and the light emitted by the light source is at least partially transmitted from the light-transmitting decorative member; and/or the connecting assembly comprises a negative electrode connector, an insulating member and a positive electrode conductive column, the negative electrode connector is provided with a through hole in which an external load is mounted and an avoidance groove in which the button cap reciprocates, the avoidance groove is convexly provided with at least one stopper, the insulating member is sleeved on the outer periphery of the positive electrode conductive column and abuts against the inner wall of the through hole, the positive electrode conductive column is fixed in the through hole, and the circuit board is electrically connected with the positive electrode conductive column and the negative electrode connector.

8. An electronic cigarette comprising an atomizer, wherein the electronic cigarette further comprises the battery assembly according to claim 1, and one end of the atomizer is fixedly mounted to the battery assembly, and is electrically connected with a circuit board provided inside the battery assembly.

* * * * *